No. 874,155.

T. L. BEAMAN.
SEED PLANTER.
APPLICATION FILED SEPT. 17, 1906.

PATENTED DEC. 17, 1907.

3 SHEETS—SHEET 1.

WITNESSES
William Whaley.
Carrie R. Ivy.

INVENTOR
Timothy L. Beaman
By Cyrus Kehr
Attorney

No. 874,155. PATENTED DEC. 17, 1907.
T. L. BEAMAN.
SEED PLANTER.
APPLICATION FILED SEPT. 17, 1906.

3 SHEETS—SHEET 2.

WITNESSES
William Whaley
Carrie R. Ivy

INVENTOR
Timothy L. Beaman
By Cyrus Kehr
Attorney

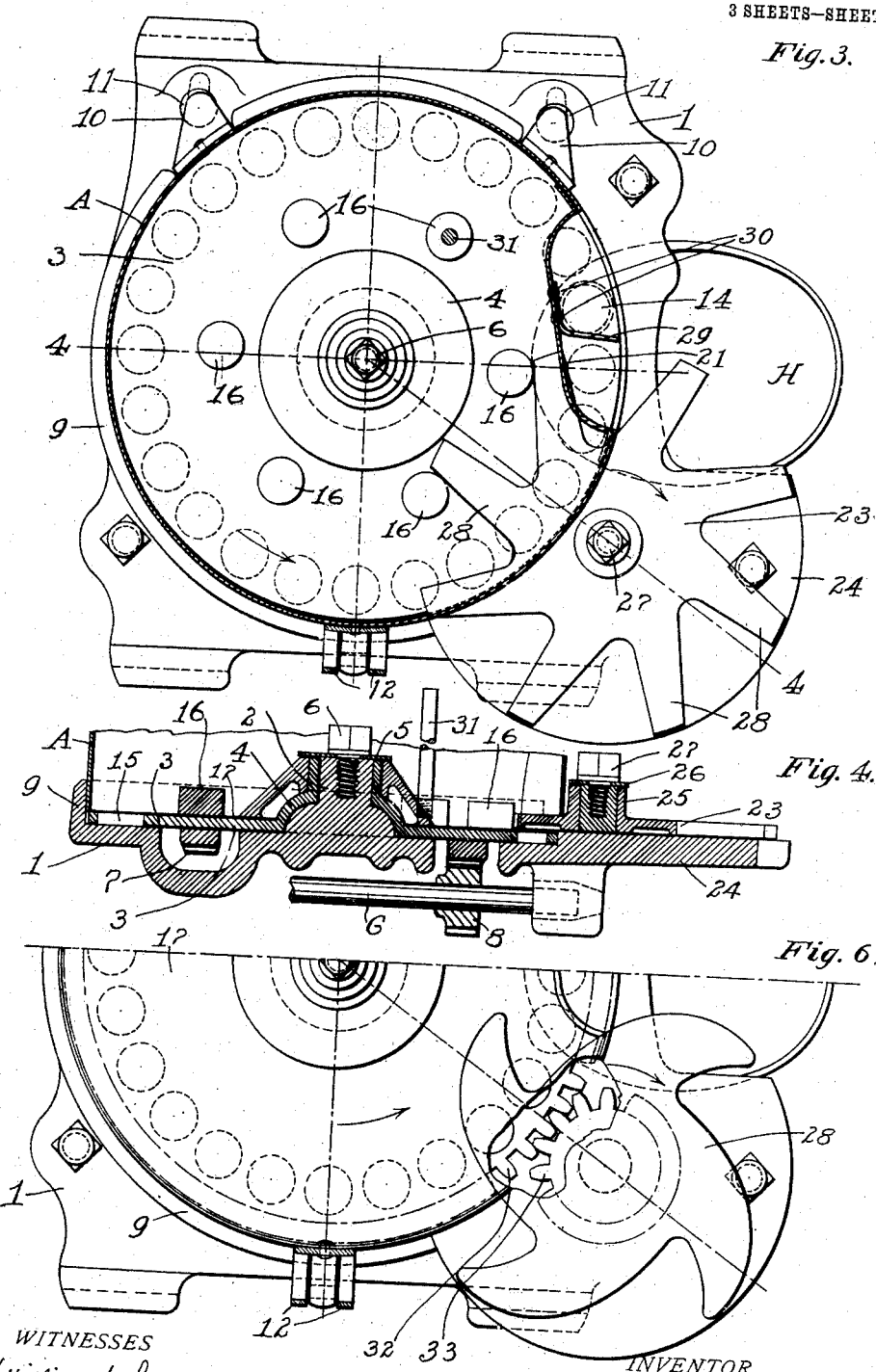

UNITED STATES PATENT OFFICE.

TIMOTHY L. BEAMAN, OF KNOXVILLE, TENNESSEE.

SEED-PLANTER.

No. 874,155. Specification of Letters Patent. Patented Dec. 17, 1907.

Application filed September 17, 1906. Serial No. 334,993.

*To all whom it may concern:*

Be it known that I, TIMOTHY L. BEAMAN, a citizen of the United States, residing at Knoxville, in the county of Knox and State of Tennessee, have invented a new and useful Improvement in Seed-Planters, of which the following is a specification, reference being had to the accompanying drawing.

My improvement relates particularly to machines for planting corn and cotton seed; but it is applicable to machines for planting other seeds and also to machines for distributing fertilizers.

The object of the invention is to provide an efficient machine for planting cotton seed, or corn, or other seeds, the machine being preferably convertible for the planting of either corn or cotton seed so that a single machine will answer for these two kinds of work.
One of the peculiarities of the improvement is that the discharge is in sight of the operator whether the machine is used for plating cotton seed or other seed or for distributing fertilizer, so that the operator may always know whether or not the hopper is empty and whether the dropping mechanism is operating.

Another peculiarity of the improvement is that when the machine is used for planting cotton seed, the seed is so worked as to overcome the massing or clinging of the seeds to each other and positively move substantially uniform quantities of seed through the discharge devices.
To this end, the machine embodies a hopper having an opening at the lower portion of its upright wall, discharge mechanism for positively taking approximately uniform quantities of cotton seed through said opening, and a shifting bottom for moving the seed in the hopper toward said opening.

The improvement also embodies efficient and convenient means for varying the quantity of corn planted when the machine is used as a corn planter.

Figure 1:
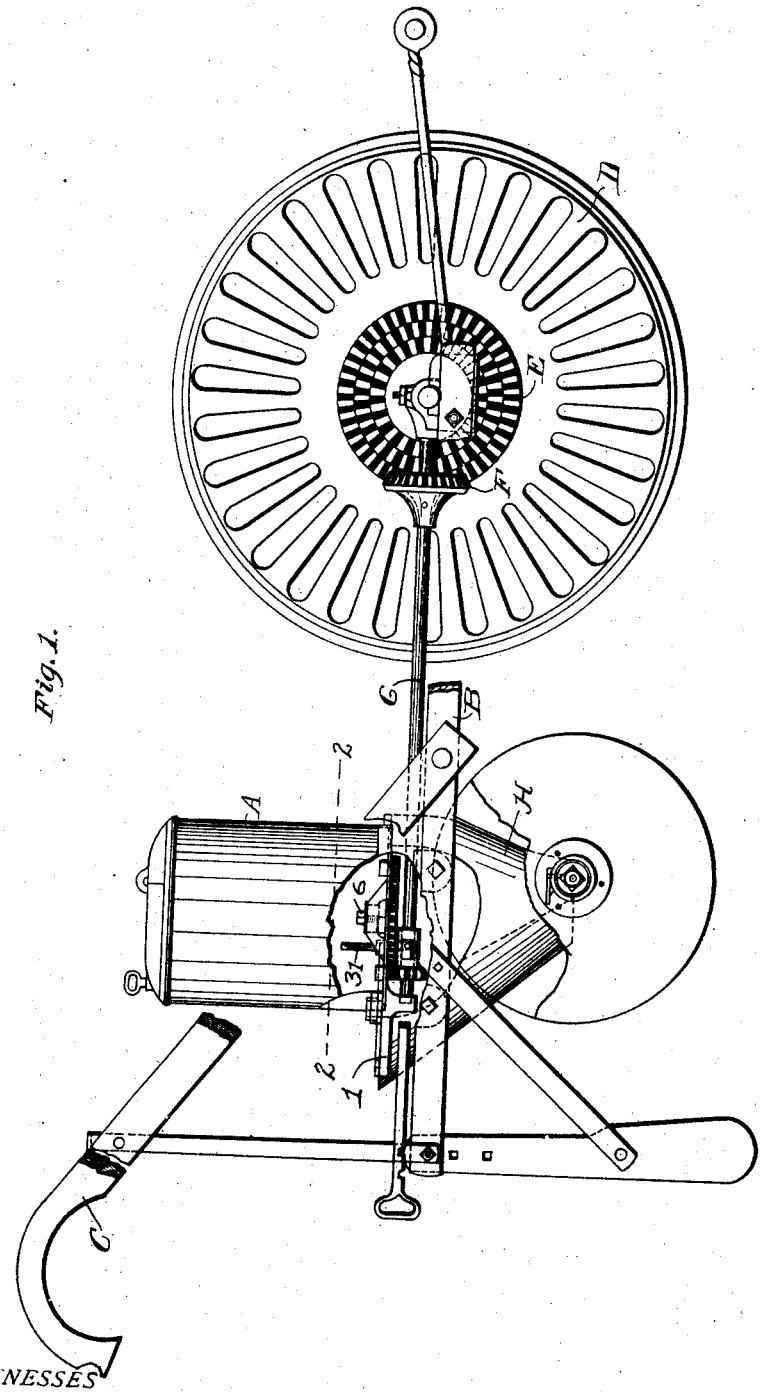
Figure 2:
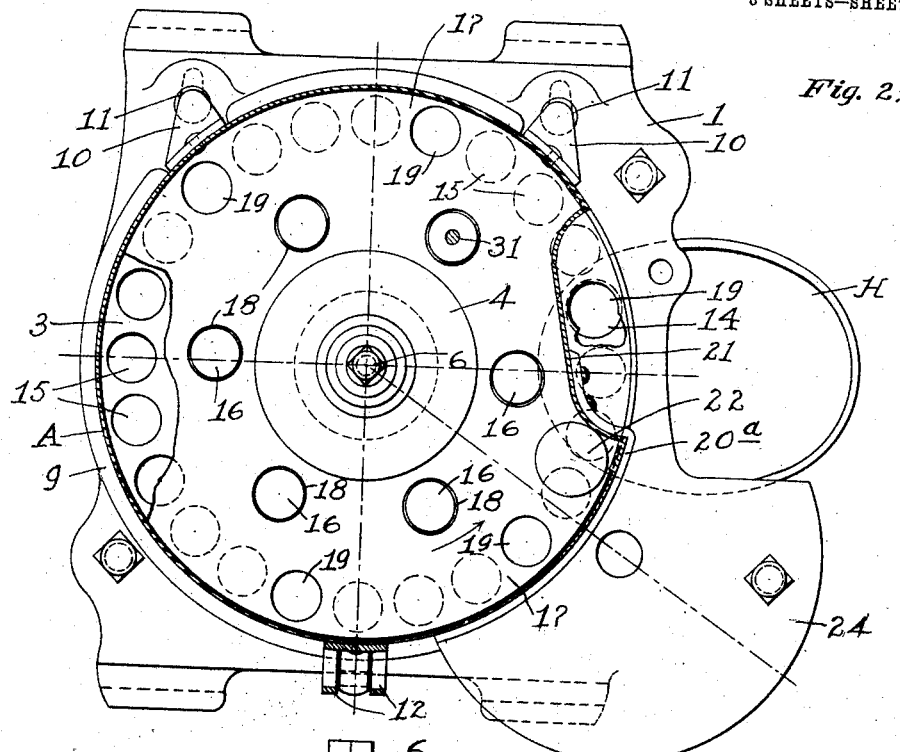
Figure 7:
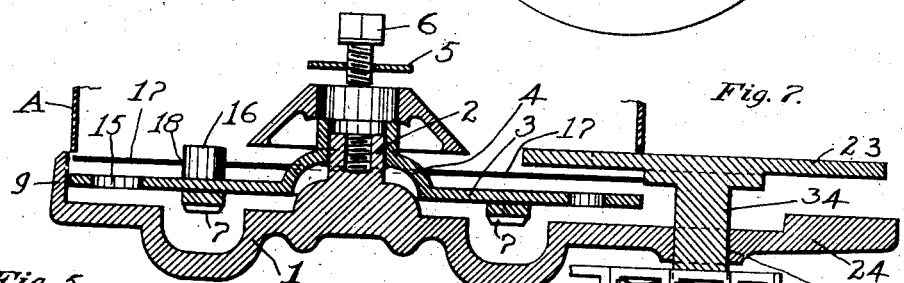
Figure 5:
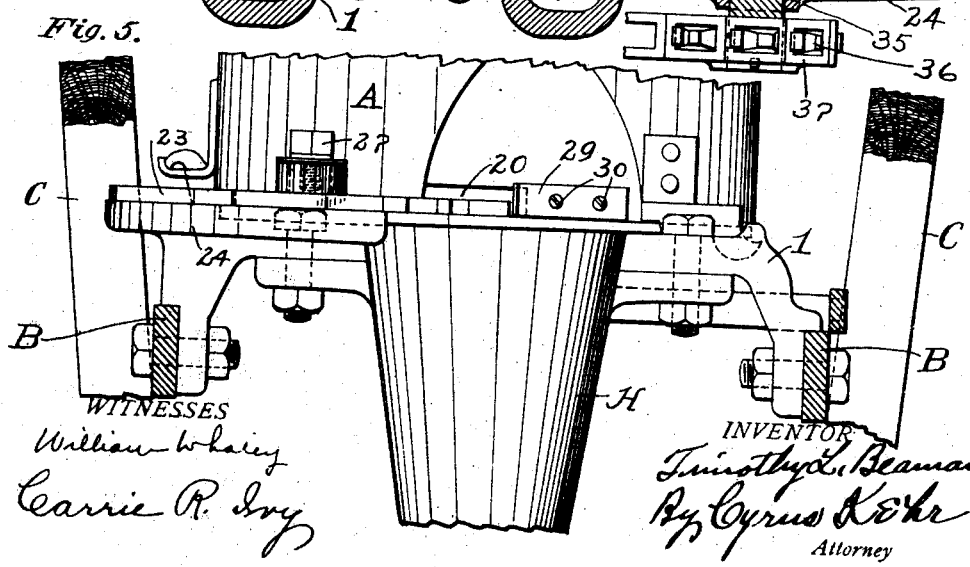

In the accompanying drawings, Figure 1 is a part sectional side elevation of a single row planter embodying my improvement; Fig. 2 is a plan on the line 2—2 of Fig. 1, the dropping mechanism being set or adjusted for planting corn and similar seeds which do not adhere to each other; Fig. 3 is a similar plan with the mechanism converted for planting cotton seed or distributing fertilizer; Fig. 4 is a section on the line 4—4 of Fig. 3; Fig. 5 is a rear elevation of the mechanism shown by Fig. 3, (looking toward the left in Fig. 3); Fig. 6 is a modification of the lower half of Fig. 3; Fig. 7 is a section like Fig. 4, excepting that the parts are partially separated and sprocket mechanism is applied for turning the cotton seed discharge member.

The planter illustrated by Fig. 1 is, as to its main features, of the well known type.

A is a hopper resting above the dropping mechanism.

B is a frame.

C is one of the handles and D is a driving wheel. On the driving wheel is a bevel gear wheel, E, meshing with the bevel gear wheel, F, on the driving shaft, G. Said driving shaft transmits power to the driving mechanism, as will be hereinafter described.

H is the usual funnel or spout by which the seed or fertilizer is conducted downward from the dropping mechanism.

The foundation to which the dropping devices are applied is a base plate, 1, mounted upon the frame, B. Base plates generically like this have heretofore been used. From the middle of said plate rises the neck, 2. Surrounding said neck and resting upon the face of said base plate is the seed plate, 3. Said seed plate is circular or disk-form and has at its middle a tubular neck, 4, conforming to the neck, 2, of the base plate. Above the necks, 2 and 4, is a flat washer, 5, and a set bolt, 6, extends downward through said washer into the neck, 2, the latter neck being a little higher than the neck, 4, so that said bolt and washer bind upon the neck, 2, and leave the neck, 4, and the seed plate, 3, free to rotate. On the lower face of the seed plate is a group of cog teeth, 7, concentric with the axis of the neck, 2, and a small spur gear wheel, 8, surrounding the drive shaft, G, meshes with the teeth, 7, for the rotation of the seed plate. This means of driving similar seed plates has been heretofore used.

A flange, 9, rises from the margin of the base plate, 1, at the front and sides of the latter. The lower edge of the wall of the hopper is received within said flange. At one side the base of the hopper has two feet, 10, which engage in holes, 11, in the base plate, 1, while at the opposite side the base of the hopper has two parallel ears, 12, resting on each side of a corresponding ear rising from the base plate. Said ears may be secured by a suitable pin or key (not shown) passing through said ears.

In the rear portion of the base plate is an opening, 14, and beneath said opening, and extending rearward thereof beyond the rear edge of the base plate is the funnel or spout, H, through which the seeds or fertilizers are conducted downward after being discharged from the dropping mechanism. Near the periphery of the seed plate, 3, in proper position to register with the opening, 14, are any desired number of apertures, 15, constituting seed cells or cups (see Fig. 2).

Between the cups, 15, and the neck, 4, are a series of upright studs, 16, of any desired number. Figs. 2 and 3 show six such studs, equi-distant from each other and in a circle concentric to the axis of the seed plate. Said seed plate may be stamped or cast and is to be of proper thickness to make the cups, 15, of the desired depth. Upon the seed plate rests a sheet metal cut-off plate, 17, which has perforations, 18, through which the studs, 16, rise and engage said plate, 17, so that the latter must rotate with the seed plate. The said cut-off plate has any desired number of apertures, 19, registering with the cups, 15. If said cut-off plate has a smaller number of such apertures than the number of cups, 15, a portion of said cups are covered or cut off from service. One half, or any other number, of the seed cups may be thus cut off. Fig. 2 shows only six of said cups exposed for action. Several sets of said cut-off plates, having different numbers of apertures, 19, may accompany each machine, so that the planting capacity of the machine may be readily varied by substituting one of the cut-off plates for another. When no seeds are to go through the seed plate, but through the rear wall of the hopper, above the seed plate, a cut-off plate having no apertures, 19, is placed upon the seed plate, as shown in Fig. 3. This is preferably done when the mechanism is to be used for planting or distributing cotton seed or fertilizer or similar material not adapted to go through the seed plate.

When the seeds are to go through the seed plate, and the cut-off plate, 17, a plate, 20ª, is placed into the opening, 20, in the rear wall of the hopper whereby the latter is closed. (See Fig. 2.) Above the cut-off plate a false or secondary wall, 21, is applied to the wall of the hopper within and opposite the opening, far enough inward to allow the apertures, 19 and 15, to pass beneath and rearward of said false wall. Said false wall constitutes a wiper for pushing back the seeds resting upon the upper face of the cut-off plate, and said wall may be yielding so as to constitute a yielding wiper or said wall may be unyielding and a yielding wiper be placed in front of said wall in the position indicated by the circle, 22, the seed plate rotating in the direction of the arrow. (As any well known form of yielding wiper may be used for this purpose, I deem it unnecessary to show and describe such a wiper in detail.)

When the machine is to be used for planting cotton seed or distributing fertilizer or some other material not adapted to pass through the seed plate, the plate, 20ª, is removed from the opening, 20, and the spider-form discharge wheel or member, 23, mounted upon the extension, 24, of the base plate, 1, by means of the neck, 25, washer, 26, and set bolt, 27, (see Figs. 3 and 4) are substituted, said discharge member extending over the seed plate and the cut-off plate to bring the arms, 28, of the discharge wheel or member, into the path of the studs, 16, which rise from the seed plate through the cut-off plate. Thus the discharge member is brought into such operative relation with the seed plate as that when the seed plate is rotated, the studs, 16, will engage and move the arms, 28, one after the other and cause the rotation of said member in the direction indicated by the arrow in Fig. 3, the arms of said member moving rearward out of the hopper beneath the false wall, 21, and through the opening, 20. When cotton seed or similar material rests upon the cut-off plate within the hopper, the portions of such material coming within the range of said arms are swept rearward by said arms beneath said false wall and through said opening into the funnel or spout, H; and by the rotation of the seed plate all the seed in the hopper is brought within range of the spider arms. To facilitate such action a deflector, 29, may be placed immediately above the cut-off plate and between the false wall, 21, and the adjacent portion of the wall of the hopper and the adjacent path of the free or outer ends of said spider arms. Said deflector serves to provide the movement of the cotton seed or similar material readily away from the spider and out of engagement with the spider arms while the latter are passing beneath said false wall and through the space between said false wall and the hopper. This deflector may be applied in a variety of ways. In Figs. 3 and 5, it is shown secured to the rear base of the false wall by means of two screws, 30. It may be removed for corn planting if so desired.

To agitate the masses of cotton seeds or similar material the studs, 16, may rise to any desired height above the cut-off plate, or a post, 31, may be placed upon any number of said studs. Figs. 2, 3, and 4, show a post upon one of said studs and I regard this sufficient to keep the seed well agitated for all ordinary work.

It will be observed that the discharge through the seed plate or over the latter is within view of the operator, so that the operator may at all times know whether the machine is discharging seeds or fertilizer or whether the hopper has become empty or in any manner clogged. This is of great importance, whatever the material may be.

It will be understood that if the machine is to be used only for the discharge of the seed or other material by means of the discharge member, the cut-off plate may be omitted and the seed plate made without the cups or apertures, 15, such rotary plate serving to bring the seed to the discharge member. It will also be understood that for the planting of cotton seed and similar material the cut-off plate may be omitted and the seed plate shown by the drawings removed and a similar plate having no seed cups substituted.

In Fig. 6, the studs, 16, are omitted so that this means of rotating the discharge member is eliminated. As a substitute construction, the periphery of the seed plate is provided with gear teeth, 32, which mesh with a small spur gear wheel, 33, attached to the lower side of said discharge member. Still another construction for the rotation of the discharge member has the shaft, 34, rigid with said wheel and rotatable in the bearing, 35, in the base plate, 1, and to the lower end of said shaft is applied a sprocket wheel, 36, and to said sprocket wheel is applied a sprocket chain, 37, which is in engagement with another sprocket wheel, not shown, preferably on the axle of the driving wheel, D.

I claim as my invention:

1. In a machine of the nature described, a hopper, a horizontal, rotary plate at the bottom of said hopper, an opening in the wall of said hopper above said rotary plate, and a horizontal discharge member extending into said opening above said plate, substantially as described.

2. In a machine of the nature described, a hopper, a horizontal, rotary plate in the lower portion of said hopper, an opening in the lower portion of the rear wall of said hopper above said plate, and a discharge member extending into said opening above said plate, substantially as described.

3. In a machine of the nature described, a hopper, a shifting bottom for said hopper, an opening in the lower portion of the wall of said hopper above said plate, a horizontal discharge member extending into said opening, and means for actuating said member, substantially as described.

4. In a machine of the nature described, a hopper, a horizontal, rotary plate in the lower portion of said hopper, an opening in the lower portion of the wall of said hopper above said plate, and a horizontal rotary discharge member extending into said opening, substantially as described.

5. In a machine of the nature described, a hopper, a horizontal, rotary plate at the bottom of said hopper, an opening in the wall of said hopper above said rotary plate, a horizontal discharge member extending into said opening above said plate and in operative relation with said rotary plate to receive rotation therefrom, substantially as described.

6. In a machine of the nature described, a hopper, a horizontal, rotary plate in the lower portion of said hopper, an opening in the lower portion of the rear wall of said hopper above said plate, and a discharge member extending into said opening and into operative relation with said rotary plate for actuating said discharge member, substantially as described.

7. In a machine of the nature described, a hopper, a horizontal, rotary plate having lugs rising from its upper surface, an opening in the lower portion of the rear wall of said hopper above said plate, a horizontal discharge member extending into said opening and into engagement with said lugs, substantially as described.

8. In a machine of the nature described, a hopper, a horizontal, apertured rotary plate in the lower portion of said hopper, an opening in the lower portion of the rear wall of said hopper, a cut-off plate extending over said rotary plate and a discharge member extending into said opening, and means for actuating said discharge member, substantially as described.

9. In a machine of the nature described, a hopper, a horizontal, apertured rotary plate in the lower portion of said hopper, an opening in the lower portion of the rear wall of said hopper, a cut-off plate extending over said rotary plate and a discharge member extending into said opening and into operative relation with one of said plates for actuating said discharge member, substantially as described.

10. In a machine of the nature described, a hopper, a horizontal, rotary plate in the lower portion of said hopper, an opening in the lower portion of the rear wall of said hopper, a discharge member extending into said opening and into operative relation with said plate for actuating said discharge member, and a cut-off plate extending over said rotary plate, substantially as described.

11. In a machine of the nature described, a hopper, a horizontal, rotary plate having lugs rising from its upper surface, and a cut-off plate resting upon said rotary plate and engaging said lugs, substantially as described.

12. In a machine of the nature described, a hopper, a horizontal, rotary plate having lugs rising from its upper surface, an opening in the lower portion of the rear wall of said hopper, a cut-off plate extending over said rotary plate and around said lugs, and a discharge member extending into said opening and into engagement with said lugs, substantially as described.

13. In a machine of the nature described, a hopper, a horizontal, rotary plate in the lower portion of said hopper, a cut-off plate extending over and engaged by said rotary plate, an opening in the lower portion of the rear wall of said hopper, and a discharge member extending into said opening, substantially as described.

14. In a machine of the nature described, a hopper, a rotary seed plate having apertures or cups, and a cut-off plate resting upon and in engagement with said seed plate, substantially as described.

15. In a machine of the nature described, a hopper, a rotary plate having apertures or cups, and a cut-off plate resting upon and in engagement with said seed plate and having apertures adapted to register with the apertures or cups of the seed plate, substantially as described.

16. In a machine of the nature described, a hopper, a horizontal rotary plate at the bottom of said hopper, an opening in the wall of said hopper above said rotary plate, a false wall adjacent said opening, a discharge member extending into said opening beneath said false wall and above said plate, substantially as described.

17. In a machine of the nature described, a hopper, a horizontal, rotary plate at the bottom of said hopper, an opening in the wall of said hopper above said rotary plate, a removable discharge member extending into said opening above said plate, and means for closing said opening after the removal of said discharge member, substantially as described.

In testimony whereof I have signed my name, in presence of two witnesses, this 13th day of September, in the year one thousand nine hundred and six.

TIMOTHY L. BEAMAN.

Witnesses:
CYRUS KEHR,
C. A. MORSE.